United States Patent [19]
McNeill et al.

[11] Patent Number: 4,736,415
[45] Date of Patent: Apr. 5, 1988

[54] RESISTIVE LINE FEED CIRCUIT

[75] Inventors: Bruce W. McNeill, Reading, Pa.; Douglas C. Smith, Rumson, N.J.

[73] Assignees: American Telephone and Telegraph Company, New York, N.Y.; AT&T Information System Inc., Morristown; Bell Telephone Laboratories, Incorporated, Murray Hill, both of N.J.

[21] Appl. No.: 752,087

[22] Filed: Jul. 5, 1985

[51] Int. Cl.⁴ .......................................... H04M 19/00
[52] U.S. Cl. .................................... 379/413; 379/405
[58] Field of Search .................. 179/70, 77, 170 NC, 179/16 F, 18 FA, 16 AA; 379/322, 324, 413, 405, 399, 405, 345, 312, 398; 370/26

[56] References Cited

U.S. PATENT DOCUMENTS

| | | | |
|---|---|---|---|
| 4,203,009 | 5/1980 | Tattersall | 379/399 |
| 4,433,215 | 2/1984 | Wortman | 370/26 |
| 4,554,412 | 11/1985 | Smith | 379/413 |

FOREIGN PATENT DOCUMENTS 2055274 2/1981 United Kingdom .

OTHER PUBLICATIONS

"Two-Way/Four-Way Circuit", D. Esteban et al., IBM Technical Disclosure Bulletin, vol. 16, No. 5, Oct. 1973, pp. 1556–1557.

*Primary Examiner*—Jin F. Ng
*Assistant Examiner*—R. Vaas
*Attorney, Agent, or Firm*—David H. Tannenbaum; David R. Padnes

[57] ABSTRACT

This is an improved resistive line battery feed circuit where the improvement consists in establishing a balanced stable power point using an opamp and capacitive input and feeding the AC output to both lines of the tip and ring circuit via opamps and a hybrid for injecting current. In this manner longitudinal balance is maintained. Current is added to the line circuit by a modulated DC current source.

8 Claims, 2 Drawing Sheets

RESISTIVE LINE FEED CIRCUIT

BACKGROUND OF THE INVENTION

This invention relates to telephone line circuits and more particularly to an arrangement for reducing crosstalk sensitivities in an inductorless circuit and the improvement of loop range in such circuits.

A telephone line circuit is interposed between the PBX line and the associated telephone station. These circuits serve, among other things, to provide both AC and DC power to activate the telephone transmitter and receiver.

Most telecommunications systems have a −48 volt DC source of power feeding power to the telephone stations. This is required by system interfaces to the external environment such as tie trunks, ground start trunks, and off premises stations. However, in situations such as PBX'S where on-premises stations are used on short loops from the PBX, −24 volts could replace the traditional −48 volt supply thereby saving power and component ratings. Complexity can be further reduced by using a −24 volt resistive line feed circuit. This is possible because a 24 volt resistive line feed circuit with a battery feed resistance of 600 ohms will supply an adequate amount of DC loop current to an on-premises station set and, at the same time, provide the required 600 ohm AC impedance to the on-premises station. The addition of a −24 volt supply increases power supply costs and adds cost to the power distribution system. For these reasons, the ability of the the our line feed circuit to efficiently supply 24 volt line feeds from a 48 volt supply, without the need for switching converters, is attractive, and, for controlled environment line loops, is commercially attractive.

Traditionally, line circuits would contain inductors or complex electronic circuitry which serve to isolate the DC power supply and to allow for the circuit's AC impedance to differ from the DC resistance. One major aim of circuit designers has been the elimination of the costly, and bulky, inductors or electronic components from the line circuits, thereby making the circuits fully resistive, i.e., where the DC resistance is the same as the AC impedance. In co-pending patent application D. C. Smith, Ser. No. 633,478, filed July 23, 1984, now U.S. Pat. No. 4,554,412 and having the same assignee as this application, there is disclosed and claimed a pair of resistive line circuits operating between −48 volts and ground. While these circuits operate properly, they are sensitive to the placement of, and wiring to, the −24 volt point. This sensitivity, which can result in excessive induced voltage signals (crosstalk) between lines, and one proposed arrangement for overcoming the problem, is discussed in the aforesaid patent application. However, since the proposed solution is highly dependent upon impedance to ground at the −24 volt point, a power bus can not be utilized, thus requiring individual wires to be run from each circuit to the common −24 volt power point. Accordingly, a need exists in the art for a resistive line circuit with improved crosstalk margins while at the same time allowing the use of a power bus common to several such circuits.

Another critical factor with resistive line circuits is the length of the line, known as the loop length, between the circuit and the associated telephone. A critical factor in determining loop length is the magnitude of available current from the line circuit. In the aforementioned disclosure, a modulated DC current source was used which subtracted from the available current and which resulted in a loop length of approximately two thousand feet of 24-gauge cable to a standard telephone set. Such a length is certainly acceptable in a majority of instances but situations do exist where it is desirable to increase the loop length beyond that range. Accordingly, a need exists in the art for a resistive line circuit where current available to the line is maximized.

SUMMARY OF THE INVENTION

We have designed a line circuit which operates on a principle similar to the one described in the aforementioned patent application, which is hereby incorporated by reference herein. In that circuit, crosstalk voltages were converted into longitudinal voltages. Our improved circuit adds an additional filter amplifier and by arranging an input filter the circuit becomes symmetrical and much less sensitive to the −24 volt bus impedance. The improved circuit exceeds 75 dB of crosstalk rejection with as much as six ohms of impedance on the −24 volt bus. These margins improve manufacturing capability significantly, thereby resulting in lower costs to the consumer.

In addition, the improved circuit uses a modulated DC current source that adds to the telephone set DC loop current thereby increasing loop length capabilities.

BRIEF DESCRIPTION OF THE DRAWING

These and other objects and features, together with the operation and utilization of the present invention, will be more apparent from the illustrative embodiment shown in conjunction with the drawing in which.

DETAILED DESCRIPTION

Figure 1:
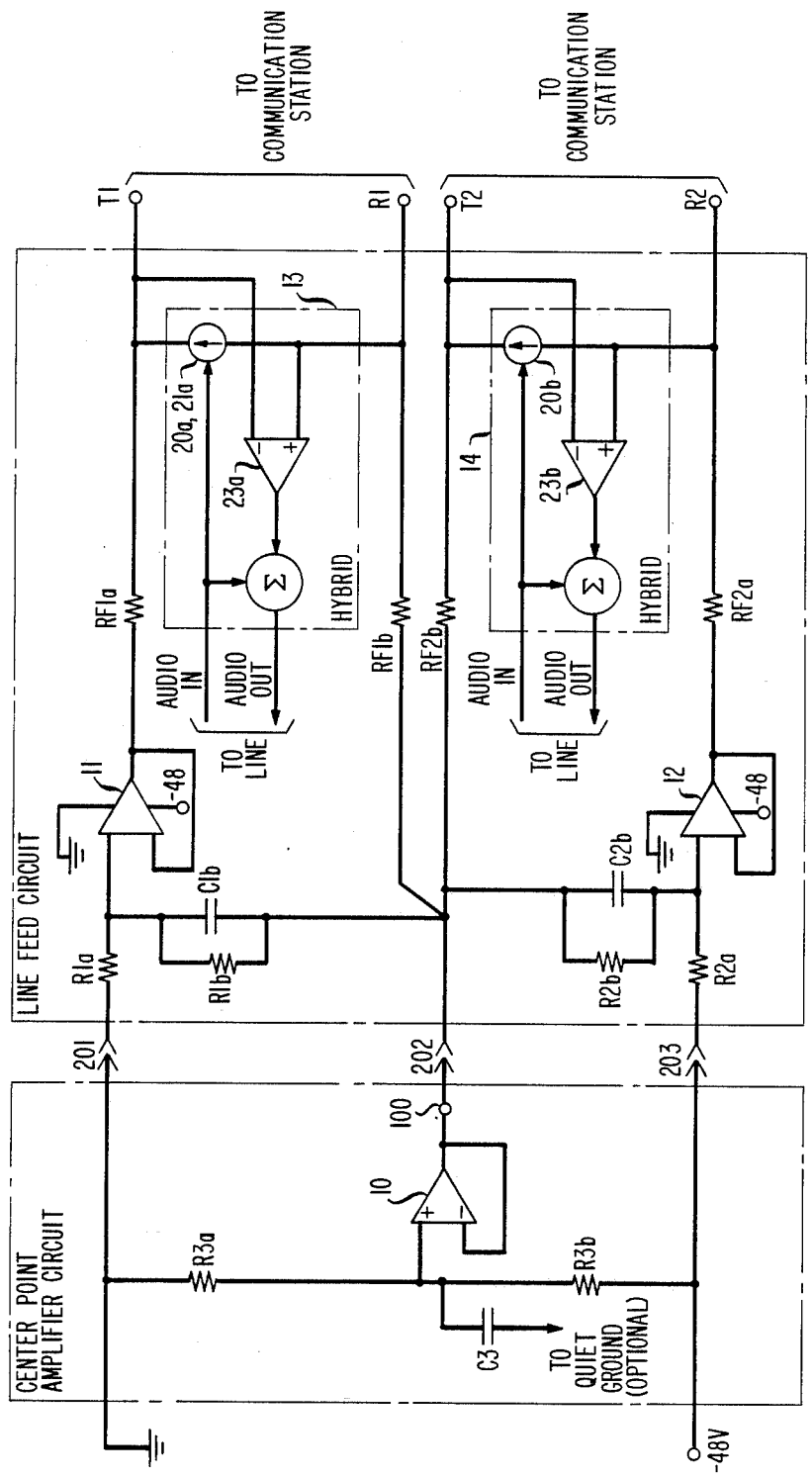
FIG. 1 is a schematic drawing showing our improved resistive battery feed circuit.

The operation of our resistive line feed circuit will become clear by referring to FIG. 1 which shows a dual line feed circuit operating between −48 volts and ground. Power opamp 10, along with resistors R3a and R3b, serve to establish a low impedance source of −24 volts, at point 100 representing the midpoint between −48 volts and ground. Several dual line feed circuits, each serving two telephone lines (T1,R1;T2,R2) can be connected to this −24 volt bus. One line feed circuit of each dual pair is connected between ground and the −24 volt bus and the other line feed circuit is connected between the −24 volt bus and −48 volt power source.

The two line circuits of each pair are symmetrical such that each is composed of an RC filter (R1a,R1b,C1b;R2a,R2b,C2b) feeding a filter amplifier (11,12) a pair of 300 ohm battery feed resistors RF1a,RF1b;RF2b,RF2a and hybrid circuitry (13,14). The audio hybrid circuitry (13,14) is composed of a balanced input opamp (23a,23b) to receive signals from the tip/ring circuit, and a modulated DC current source (20a,20b) to place audio signals on the tip/ring circuit from the audio input. The DC current source, approximately 5 mA, adds to the current in the telephone line thus extending the loop range. The operation of the hybrid circuit will be more fully discussed hereinafter with reference to FIG. 2.

As discussed above, resistive line feed circuits are subject to crosstalk coupling through power supply and ground leads and do not reject power supply noise well.

With reference to the T1/R1 line feed (the T2/R2 line feed operation is similar except for the DC voltage levels), resistors R1a and R1b along with capacitor C1b furnish a "quiet" DC level to filter the input to amplifier 11. This voltage is then fed to line T1 through feed resistor RF1a. This arrangement serves to reject noise and crosstalk on the ground lead.

Capacitor C3 is normally used to connect the input of opamp 10 to a "quiet" ground. The point on the circuit to which capacitor C3 is connected determines the longitudinal "noise" voltage present on the tip and ring leads. Alternately, capacitor C3 can be connected, for example, to −48 volts, and then the AC voltage riding on the −48 power leads would set the longitudinal voltage on the tip and ring leads of both circuits.

The ratio of resistor R1a to resistor R1b sets the DC voltage on the T1 lead a few volts below ground so that opamp 11 does not saturate. This ratio should be approximately 0.1 to 0.15. The values of R1a and R1b along with the value of capacitor C1b should be chosen so that the corner or break frequency of R1a in parallel with R1b and C1b is about 10 Hz.

Crosstalk between the line feed circuits due to the common −24 volt bus is rejected if capacitor C1b and resistor RF1b are connected to the −24 volt bus at the same point 100. This follows since whatever noise or crosstalk voltages are present on the −24 volt bus at point 100 are fed equally to lead R1 through resistor RF1b and to lead T1 via capacitor C1b, opamp 11 and resistor RF1a. These voltages thus become longitudinal voltages on leads T1/R1 and, as such are not heard in the telephone as the loop and telephone comprise a balanced circuit. The noise or crosstalk voltages on the −24 volt bus at point 100 will be reduced by the balance coefficient of the station loop and port circuit as heard in the telephone set.

If a −24 volt supply exists the Center Point Amplifier Circuit of FIG. 1 can be eliminated. There would still, however, be a need for noise and crosstalk reduction if a resistive battery feed is to be used. This performance improvement can be obtained by using either the upper or lower half of the line feed circuit of FIG. 1 for each port to be served. If the upper half is chosen, ground is connected to input 201 and −24 volts to input 202. If the lower half is chosen, ground is connected to input 202 and −24 volts to input 203. Both halves will provide crosstalk rejection, but the upper half will reject ground noise and the lower half will reject noise on the −24 volt supply. The lower half will prevent power supply noise from reaching the tip and ring circuit either as a longitudinal or metallic signal, and thus, would be more useful in practical applications than the upper half.

Figure 2:
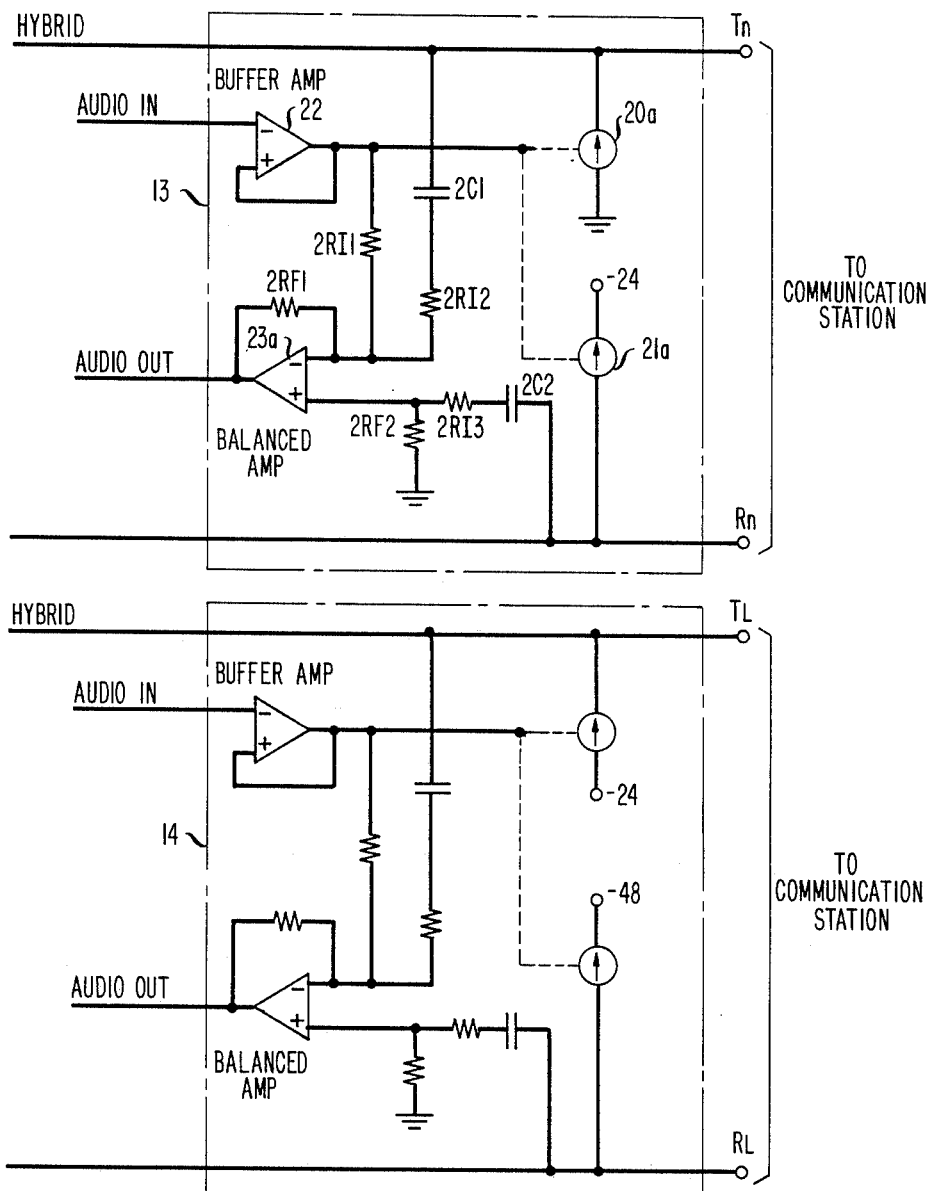
FIG. 2 shows a more detailed schematic of the hybrid circuit.

With reference to FIG. 2, the audio signal to be sent to the communication station is buffered by buffer amplifier 22 and the resultant audio signal is used to control the current sources 20a and 21a. This buffer amp is not shown in FIG. 1 for simplicity. These two current sources shown functionally in FIG. 1 as a single source, inject a DC current of about 5 mA modulated by the desired audio signal onto the tip and ring leads to the station set. This DC is polarized so as to add to the DC being supplied by the respective resistive battery feed circuit. This extra DC current then helps to extend the loop range of the circuit. Implementations of the modulated DC current sources are well known in the art.

Audio signals are received from the station set by balanced amplifier 23a. This amplifier serves to receive the balanced, metallic, signal voltage from the station set and also to reject common mode, longitudinal, noise voltage that may be present on the station loop. This rejection occurs because lead Tn is extended to the negative input of amplifier 23a while lead Rn is extended to the positive input of that amplifier. Capacitors 2C1 and 2C2 block the DC loop voltage and thus prevent amplifier 23a from becoming saturated. Resistors 2RI2, 2RI3, 2RF1, and 2RF2 serve to set the receive path audio gain. Resistor 2RI1 is used to subtract the signal transmitted to the station set from the input of opamp 23a. In this way, the received signal at the output of opamp 23a would ideally contain only the received signal from the station set. Methods of calculating the values of the above resistors for varied conditions are well known in the art.

CONCLUSION

It is recognized that the various elements of the line feed circuit have all, one way or another, been utilized previously. However, when these elements have been combined in the unique manner disclosed herein, a synergistic result emerges in that a commercially viable, inductorless, fully balanced, low crosstalk line feed circuit is made possible for the first time. Experiments have shown that six ohms of resistance can be introduced between point 100 and the battery line feed circuit without causing crosstalk problems.

What is claimed is:

1. A line feed circuit for supplying DC power from a power source to a communication station, said circuit comprising, in combination, means, including a first opamp connected between a ground point and a voltage point of said DC power source, for supplying a common filtered power point having a voltage between said ground and voltage points, means, including a first resistor, for connecting said filtered power point to one of a pair of lines leading to said communication station, means, including a second opamp having a capacitively-connected input for connecting said filtered power point to the other of said pair of lines leading to said communication station, means, including a resistively connected input to said second opamp and a second resistor substantially equal in value to said first resistor for connecting either said ground point or said voltage point of said DC power source via the output of said second opamp to said other of said pair, and means connected between said line pair for controlling audio signals to and from said communication station and wherein said controlling means includes a modulated DC current source connected so as to add to the DC loop current in said line pair.

2. The invention set forth in claim 1 further comprising means for selecting any desired voltage point on said line feed circuit as a reference point for establishing longitudinal noise voltages on said line pair to said communication station.

3. The invention set forth in claim 2 wherein said selecting means includes a capacitively-connected input to said first opamp.

4. A dual line feed circuit for supplying DC power from a power source to a pair of communication lines, said circuit comprising, in combination, means connected between the ground point and voltage points of said DC power source, for supplying a common filtered power point having a voltage substantially midway between said ground and voltage points, means including a first resistor for connecting said filtered power point to a first line of a first pair of communication lines, and means including a second resistor for connecting said filtered power point to a first line of a second pair of communication lines, means, including a first opamp having a capacitively-connected input for connecting said filtered power point separately to the second line of said first pair of lines, means, including a second opamp having a capacitively-connected input for connecting said filtered power point separately to the second line of said second pair of lines, means, including a resistively-connected input to said first opamp and a third resistor substantially equal in value to said first resistor for connecting said ground point of said DC power source to said second line of said first pair of lines, and means, including a resistively-connected input to said second opamp and a fourth resistor substantially equal in value to said second resistor for connecting said voltage point of said DC power source to said second line of said second pair of lines.

5. The invention set forth in claim 4 wherein said means for providing a common filtered power point includes a third opamp connected between said ground point and said voltage points of said DC power source.

6. The invention set forth in claim 5 further comprising means for selecting any desired voltage point on said line feed circuit to establish longitudinal noise voltage levels on said line pairs.

7. The invention set forth in claim 6 wherein said selecting means includes a capacitively-connected input to said third opamp.

8. The invention set forth in claim 4 wherein said dual line feed circuit further comprises a pair of hybrid circuits, each connected between one of said line pairs for controlling audio signals to and from said communication line pair and wherein each said hybrid includes a modulated DC current source connected such as to add to the DC loop current in said line pairs.

* * * * *